United States Patent [19]

Yamada et al.

[11] Patent Number: 5,650,706
[45] Date of Patent: Jul. 22, 1997

[54] CONTROL DEVICE FOR SALIENT POLE TYPE PERMANENT MAGNET MOTOR

[75] Inventors: Eiji Yamada, Owariasahi; Yasutomo Kawabata, Aichi-ken, both of Japan

[73] Assignee: Toyota Jidosha Kabushiki Kaisha, Aichi-ken, Japan

[21] Appl. No.: 447,699

[22] Filed: May 23, 1995

[30] Foreign Application Priority Data

Aug. 2, 1994 [JP] Japan .................................. 6-181031
May 16, 1995 [JP] Japan .................................. 7-117440

[51] Int. Cl.$^6$ .................. H02P 6/00; H02P 7/63; B60L 15/20
[52] U.S. Cl. .................. 318/701; 318/138; 318/254; 318/723; 318/811
[58] Field of Search .................. 318/138, 139, 318/254, 245, 439, 799–832

[56] References Cited

U.S. PATENT DOCUMENTS

| | | | |
|---|---|---|---|
| 4,039,853 | 8/1977 | Koizumi et al. | 308/101 |
| 4,427,934 | 1/1984 | Tupper | 318/723 |
| 4,794,310 | 12/1988 | Lukas et al. | 318/342 |
| 4,811,609 | 3/1989 | Nishibe et al. | 73/862.36 |
| 4,916,368 | 4/1990 | Onoda et al. | 318/723 |
| 5,253,127 | 10/1993 | Ozaki et al. | 360/57 |
| 5,280,222 | 1/1994 | Von Der Heide et al. | 318/138 |
| 5,291,115 | 3/1994 | Ehsani | 318/701 |
| 5,410,235 | 4/1995 | Ehsani | 318/701 |
| 5,506,487 | 4/1996 | Young et al. | 318/811 |

FOREIGN PATENT DOCUMENTS 60-197181  10/1985  Japan.
7-59310   3/1995  Japan.

OTHER PUBLICATIONS

"Maximum Torque Control of Inverse–Salient Pole Type PM Motor", *1991 National Convention Record I.E.E.*, K. Hatanaka et al., 1991, No. 580, pp. 6–10.

*Primary Examiner*—Paul Ip
*Attorney, Agent, or Firm*—Oliff & Berridge

[57] ABSTRACT

A control device for a salient pole type permanent magnet motor. A magnetic flux of a magnet is detected by an arithmetic operation or actual measurement, and a demagnetization rate is calculated in accordance with the thus detected magnetic flux. A target of controlling the phase is calculated with reference to a demagnetization rate obtained by the calculation. The phase of a motor current is controlled depending on the target of control obtained by the calculation. Thus, a torque is prevented from lowering due to demagnetization of the magnet.

7 Claims, 6 Drawing Sheets

CONTROL DEVICE FOR SALIENT POLE TYPE PERMANENT MAGNET MOTOR

BACKGROUND OF THE INVENTION

1. Field of the Invention

This invention relates to a control device for controlling a driving current of a permanent magnet motor (PM motor) having a pole saliency.

2. Description of Related Art

FIG. 5 shows a schematic structure of a salient pole type permanent magnetic motor (PM motor), where an end surface of the motor is illustrated. A predetermined number of permanent magnets 12 and salient poles 14 having a specified interval between each other are disposed on an outer circumference surface of a rotor yoke 10 opposing a stator 16. When a torque current Iq flows into a stator winding (not shown), a magnet torque is generated by the current Iq and flux φ of the permanent magnets 12, and thus a rotor rotates. In addition, when an excitation current Id flows into the stator winding, a reluctance torque arisen due to the presence of the salient poles 14 formed of magnetic material. Therefore, a torque T of the motor of this kind is generally equal to a value which is expressed by the following equation. A first term within parenthesis on right-hand side of the equation represents a magnet torque, and a second term of the same represents a reluctance torque.

$$T = p(\phi + \Delta L \cdot Id)Iq$$

where "p" represents a number of pole pairs, φ [wb] a flux of the magnets, $\Delta L = Ld - Lq$, Ld[H] a d-axis component of a primary inductance of the motor (d-axis inductance), Lq[H] a q-axis component of a primary inductance of the motor (q-axis inductance), Id[A]=I·sin θ a d-axis driving current (excitation current), Iq[A]=I·cos θ a q-axis driving current (torque current), I[A] an amplitude of motor current, and θ [deg] a phase of motor current.

For controllably driving the motor having such a construction, a current vector (I,θ) of the motor is controlled depending on a required torque, i.e., reference torque. On the other hand, for the PM motor, a counterelectromotive force is generated following increase of a number of rotations N, and in turn, an angular frequency ω of the motor current. Thus, the control proceeds in a lower rotational speed region to make the excitation current Id 0 (non-salient pole machine) or a predetermined value (salient pole machine), and in a higher rotational speed region to give a negative excitation current Id so as to cancel the counter electromotive force. As a result of such control, an upper limit of an output torque T of the motor is limited by a specified value (maximum torque) which is equal to or less than a rotational speed where a counterelectromotive force begins to exceed a power supply voltage, and an upper limit of an output power=torque T×rotational speed N of the motor is limited by a specified value (maximum power) which is more than such rotational speed (see FIG. 6). A reference torque, which is determined depending on the characteristic as described above, is converted into an amplitude I and a phase θ of the motor current, namely, a reference current (I, θ) (see FIG. 7). The reference current obtained by conversion is used for controlling switching elements constituting an electric power circuit (for example, an inverter) which controls current supply to the motor.

The PM motor having the pole saliency produces a reluctance torque in addition to a magnetic torque as described above. Therefore, a torque of the motor can always be controlled for the maximum value by controlling a phase θ of the motor current so that a sum of the magnet torque and the reluctance torque comes maximum, as described in Hatanaka et al., "Maximum Torque Control of Inverse-Salient Pole Type PM Motor" 1991 NATIONAL CONVENTION RECORD I.E.E. Japan, April, No. 580, pp.6–10.

However, the permanent magnet has a property of generating demagnetization (this is also referred to as "demagnetism" or "degaussing"), where a magnetic flux φ is reduced with use while depending on temperature, environment, or the like. With demagnetization occurring, the magnet torque gradually becomes not generated, and in addition, a sudden increase of temporary thermal load and damage of the permanent magnet arises to produce the same phenomenon. For these reason, when the magnet torque is being decreased, the motor torque T that is a sum of the magnet torque and the reluctance torque is also decreased as shown in FIG. 8, and it becomes difficult to realize a torque (reference torque) as required (in the drawing, φ represents an electromotive force, and is expressed as a percentage of a normal value).

A target value of the phase θ of the motor current, i.e., a target value of the phase θ set such that a sum of the magnet torque and the reluctance torque becomes maximum, is normally set under the precondition that demagnetization does not arise on the permanent magnet. Actually the phase θ, where a sum of the magnet torque and the reluctance torque becomes maximum, is varied when demagnetization arises. Hence, in a state where the demagnetization arises, only a small torque is obtained even in comparison with a maximum torque which can be outputted in the demagnetization state.

SUMMARY OF THE INVENTION

An object of the present invention is to obtain the maximum torque which can be output in the demagnetization state although a required torque is not satisfied.

A first aspect of the invention is a device for controlling a salient pole type permanent magnet motor having a permanent magnet generating an excitation magnetic flux. Such a device comprises a demagnetization detecting means for detecting demagnetization of the permanent magnet, and a phase control means for changing a phase of current supplied to the salient pole type permanent magnet motor depending on a detected value of the demagnetization.

A second aspect of the invention is a method of controlling a salient pole type permanent magnet motor having a permanent magnet capable of generating an excitation magnetic flux. The method comprises the steps of detecting demagnetization of the permanent magnet and varying a phase of current supplied to the salient pole type permanent magnet motor depending on a detected value of the demagnetization.

A third aspect of the invention is a motor system comprising; a salient pole type permanent magnet motor including a permanent magnet for generating an excitation magnetic flux; a demagnetization detecting means for detecting demagnetization of the permanent magnet; and a phase control means for varying a phase of current supplied to the salient pole type permanent magnet motor depending on a detected value of the demagnetization.

According to the invention, first a level demagnetization of the permanent magnet is detected, and depending on thus detected demagnetization, a phase of the motor current is variably controlled. Hence, even in the event generation of demagnetization in the magnet, there can be realized a phase where a sum of the magnet torque and the reluctance torque becomes maximum, and in turn, the control is achieved for a maximum torque that can be output under the conditions of such demagnetization. In other words, the maximum torque which can be output under the condition of such demagnetization is output, although the required torque is not satisfied. This also means that, although demagnetization is generated, an increase of a current amplitude can be suppressed to a minimum value, an output torque approximating a required value can be secured, and in addition, power consumption is reduced.

Detection of demagnetization is realized by a procedure described in the following. For example, an electromotive force of the permanent magnet at a present instant is calculated in accordance with a voltage and current supplied to the salient pole type permanent magnet (PM) motor, a rotational speed of the salient pole type PM motor, and a first inductance of the salient pole type PM motor. Next, a demagnetizing rate of the permanent magnet at the present instant is detected in accordance with an electromotive force at a normal condition of the permanent magnet and an electromotive force of the permanent magnet at a present instant. The electromotive force at a normal condition as described here means an electromotive force of the permanent magnet In a state where there is no demagnetization. Of course, instead of the method as described above, direct detection may preferably be performed. However, indirect detection performed by the above described procedure to realize detection of the demagnetization is favorable since it avoids increase of the number of sensors.

Further, a phase control is realized by the procedure as described below. For example, in accordance with the maximum-torque-phase in a state where demagnetization has not arisen in the permanent magnet and a demagnetizing rate of the permanent magnet at the present instant, the maximum-torque-phase at the present instant is calculated. Next, a phase of current to be supplied to the salient pole type PM motor is controlled for the maximum-torque-phase at the present instant. The term "maximum-torque-phase" means a value of phase to maximize an output torque of the salient pole type PM motor in the case of using the value as a target of phase of the current supplied to the salient pole type PM motor. This procedure is realized by modifying the conventionally known vector control or the like, and this therefore enables easy implementation.

Motors, which can be applied the present invention, are not limited to the conventional salient pole type PM motors. The invention can be applied to a salient pole type PM motor that is realized as a combination of a permanent magnet motor member with a reluctance motor member. The permanent magnet motor member has a predetermined number of permanent magnets disposed at predetermined electrical angular intervals 'as supported on a rotating shaft of the salient pole type PM motors, and the reluctance motor member has a predetermined number of salient poles arranged at predetermined electric angular intervals as supported on the rotating shaft of the salient pole type PM motor. The permanent magnet motor member is allowed to dedicatedly generate a magnetic torque, and the reluctance motor member is allowed to dedicatedly generate a reluctance torque. The permanent magnet motor member and the reluctance motor member are partitioned respectively, for example, along an axis direction of the rotating shaft on the rotor, and in addition, are magnetically separated with each other, thereby, they are both successfully combined. Therefore, a magnetic torque and a reluctance torque are available together under the same control condition. Furthermore, magnetic paths and shapes of the permanent magnet and the salient pole are prevented from interfering with each other, and this therefore provides a freedom of design, optimum constructions for both shapes, and a higher output power with a reduction of torque fluctuations.

When the invention is applied to a driving system of an electric vehicle, the use therefor includes a direct-current power supply, for example, a battery, and electric power conversion means for converting the direct-current power Into an alternating-current power, such as an inverter. In such a case, phase control means controls a conversion process due to the electric power conversion means, and thereby a current phase supplied to the salient pole type PM motor is varied depending on a detected value of demagnetization.

DETAILED DESCRIPTION OF THE PREFERRED EMBODIMENTS

The preferred embodiments according to the invention are described with reference to the drawings. The symbols and numerals which have been used in the description of the prior art are similarly used throughout.

Figure 1:
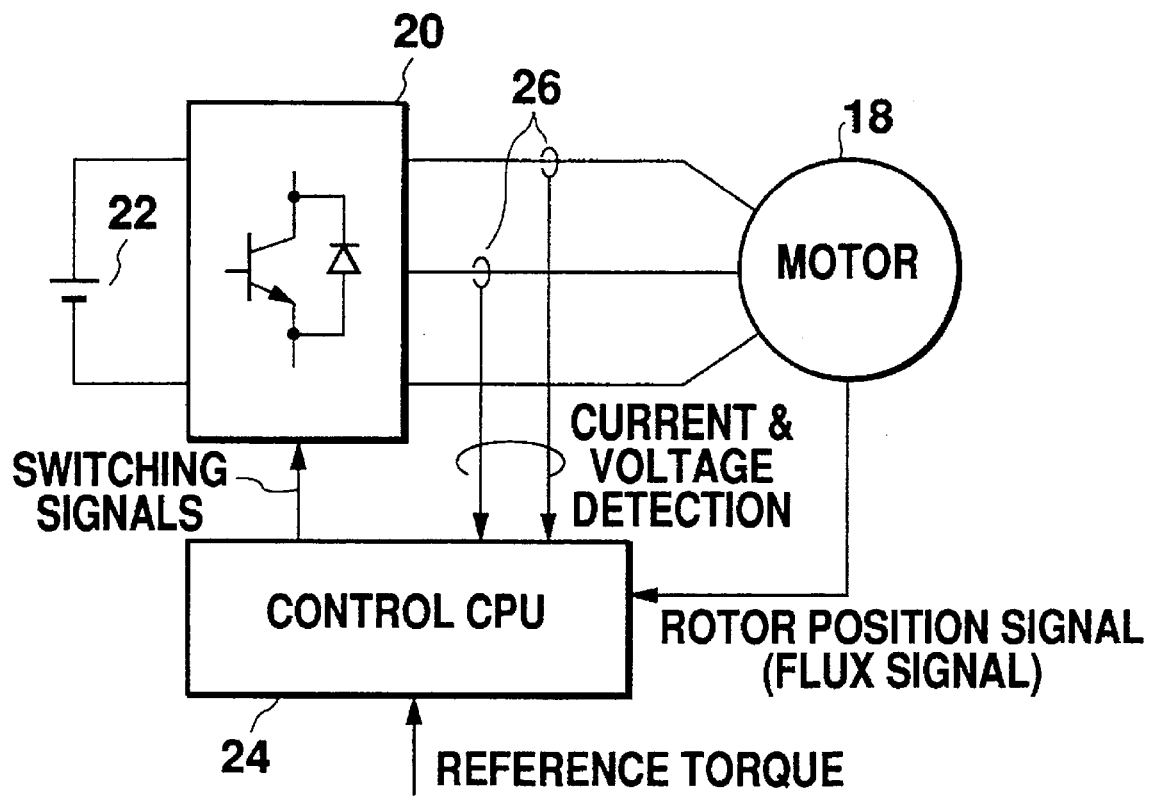
FIG. 1 is a block diagram showing a structure of a control device of one embodiment according to the invention.
Figure 5:
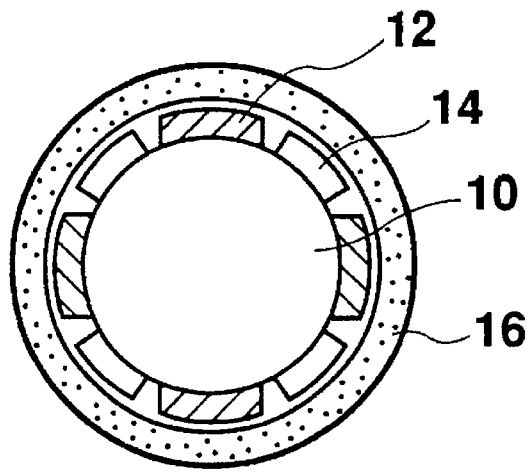
FIG. 5 is an end view showing a structure of a salient pole type permanent magnet motor.
Figure 6:
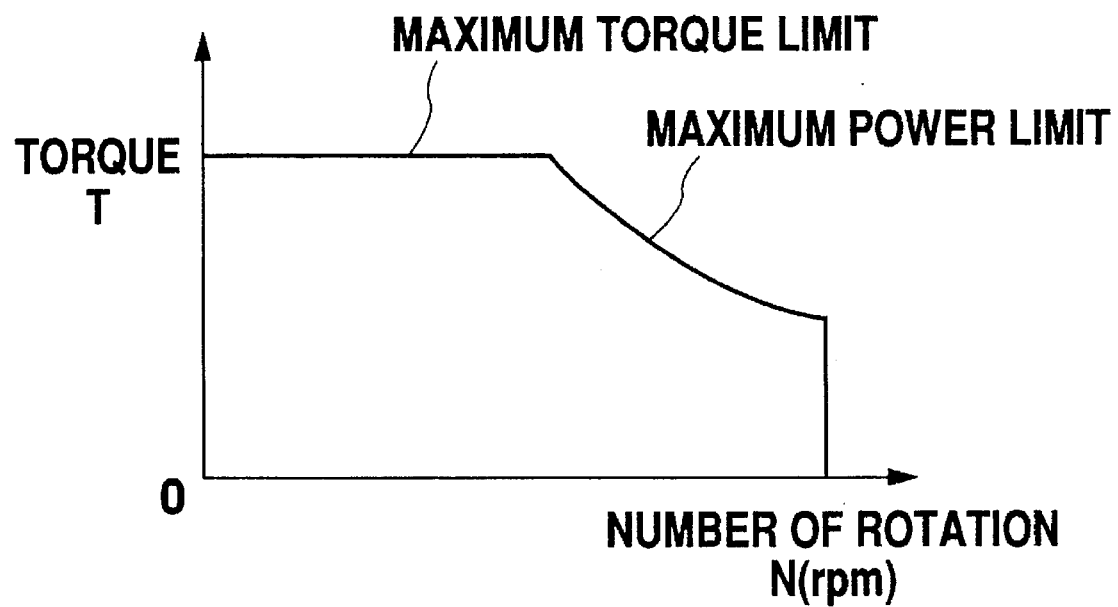
FIG. 6 is an illustrative view showing a torque characteristic of a motor.

FIG. 1 shows a structure of a control device according to an embodiment of the Invention. The control device in the drawing is a device for controlling a running motor 18 of an electric vehicle. A salient pole type PM motor having a structure shown in FIG. 5 is used as a motor 18. Electric power for driving the motor 18 is supplied through an inverter 20 from a power supply 22 such as a vehicle battery or the like. The electric power supplied from the power supply 22 is converted from direct-current to three-phase alternating-current in the inverter 20.

A control CPU 24 controls an electric power conversion in the inverter 20 to realize, at the motor 18, a reference torque supplied from a supervision CPU etc. In detail, the control CPU 24 produces the reference current, which is a target control value in relation to a current vector of the motor 18, in accordance with the reference torque given following an accelerator (accel) operation, a braking operation or the like, and such a reference current is further converted into switching signals to be supplied to the Inverter 20. In the inverter 20, a power conversion operation is performed depending on the supplied switching signals, and consequently, the reference torque is realized in the motor 18. In this operation, the control CPU 24 detects a position of a rotor of the motor 18 to obtain a rotational speed N from the thus detected position, and refers to the resultant. The control CPU 24 further detects a motor current and voltage, also using a sensor 26.

Figure 2:
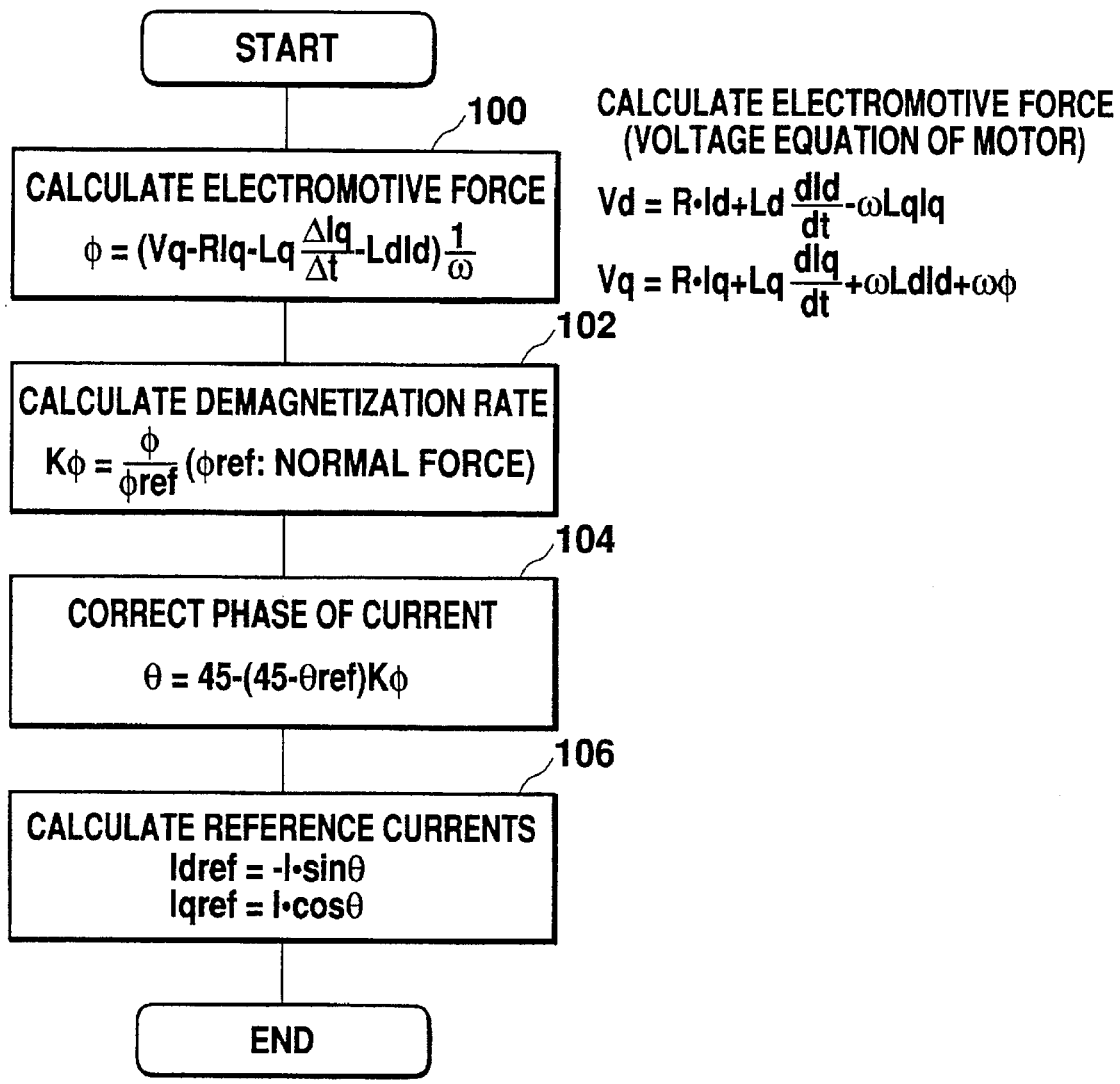
FIG. 2 is a flow chart showing operation of a control CPU in the embodiment.

A feature of this embodiment resides in that demagnetization of a magnet 12 is detected in the control CPU 24 and a phase of the reference current is changed depending of the detected result. FIG. 2 shows a flow of operation of phase compensation for the reference current due to the demagnetization.

A voltage equation of the salient pole type PM motor is generally expressed as follows.

$$Vd = R \cdot Id + Ld \cdot dId/dt - \omega Lq Iq$$

$$Vq = R \cdot Id + Ld \cdot dId/dt + \omega Lq Iq + \omega \phi$$

where Vd[V] represents a d-axis voltage, Vq[V] a q-axis voltage, $\omega$[rad]=$2\pi$pN/60, and N[rpm] a number of rotation of the motor. By modifying this equation into difference equations and solving for magnetic flux $\phi$, the following equation is established.

$$\phi = (Vq - R \cdot Iq - Lq \cdot \Delta Iq / \Delta t - LdId)/\omega$$

The control CPU 24 calculates a right hand side of the equation to obtain the magnetic flux $\phi$ (100). From among the quantities appearing on the right hand side of the equation, R, Lq, Ld, and p are each constants, and Vq, Iq, and Id are actually measured by the sensor 26. $\Delta T$ is a sampling interval of Iq etc. and is determined at the time of design. $\Delta Iq$ is a variance of Iq in $\Delta T$, and thus this can be obtained by an arithmetic operation. The magnetic flux $\phi$ may preferably be detected by sensors such as a Hall device, a magneto resistance element or the like. The control CPU 24 thus obtains the present magnetic flux $\phi$, and thereafter, through the following arithmetic operation, using a magnetic flux $\phi$ref before demagnetization, a demagnetization rate K$\phi$ is obtained (102).

$$K\phi = \phi/\phi ref$$

Here, after the time that the magnet 12 has completely been demagnetized, a torque T becomes only a reluctance torque. Since Id=-I·sin $\theta$ and Iq=I·cos $\theta$, the torque T is expressed by the following equation.

$$T = (p \cdot \Delta L \cdot I^2)/2 \cdot \sin 2\theta$$

As is apparent from this equation, the reluctance torque is maximized at $\theta$=45 [deg]. On the other hand, the magnet torque is maximized when $\theta$=0 [deg], i.e., when motor currents all are torque currents Iq. From these facts, a relationship between a total torque T of a magnet torque plus a reluctance torque and a phase $\theta$ when an amplitude I of the motor current is made constant, can be expressed as in FIG. 3.

Figure 3:
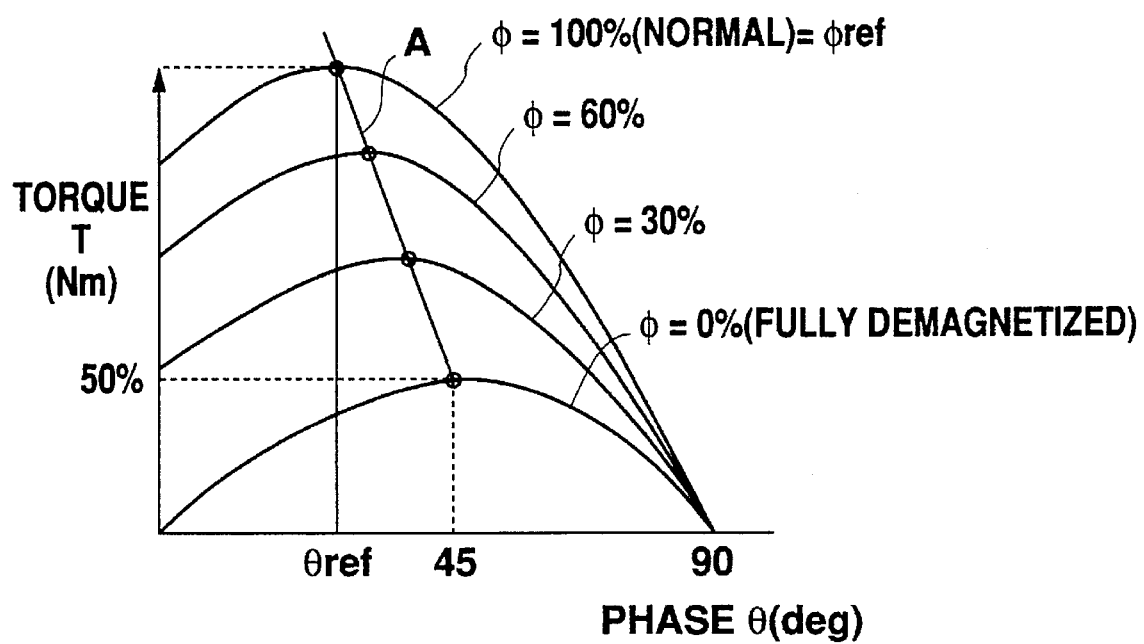
FIG. 3 is a graphical representation showing a relationship between a maximum torque and a phase.

A line "A" appearing in FIG. 3 particularly shows a variation of a phase $\theta$ where the torque T is maximized, and in particular, it shows the variation following demagnetization. Accordingly, an arithmetic operation for a linearly proportional division is performed in accordance with the present magnetic flux $\phi$ which has previously been arithmetic-operated, thereby finding a phase $\theta$ where a torque T is maximized in the present magnetic flux $\phi$ (104).

The equation of the arithmetic operation of such proportional division is expressed by the following.

$$\theta = 45 - (45 - \theta ref)K\phi$$

where $\theta$ ref represents a phase $\theta$ at which the torque T is maximum in a not-yet-demagnetized state. After $\theta$ is produced in such a manner, the control CPU 24 performs an arithmetic operation based on the equation below, using the conventional amplitude I.

$$Idref = -I \cdot \sin \theta$$

$$Iqref = I \cdot \cos \theta$$

Thereby, an excitation reference current Idref and a torque reference current Iqref are obtained (106). The motor 10 is controlled, as formerly described, in accordance with the thus obtained reference current (Idref, Iqref), and an output torque T of the motor 10 when demagnetization is generated, without satisfying the reference torque, becomes a maximum torque available for outputting in such a demagnetization state. A negative sign on right hand side of the equation above for obtaining Idref comes from a requirement to give a negative excitation current Id for canceling a counter electromotive force.

Figure 4:
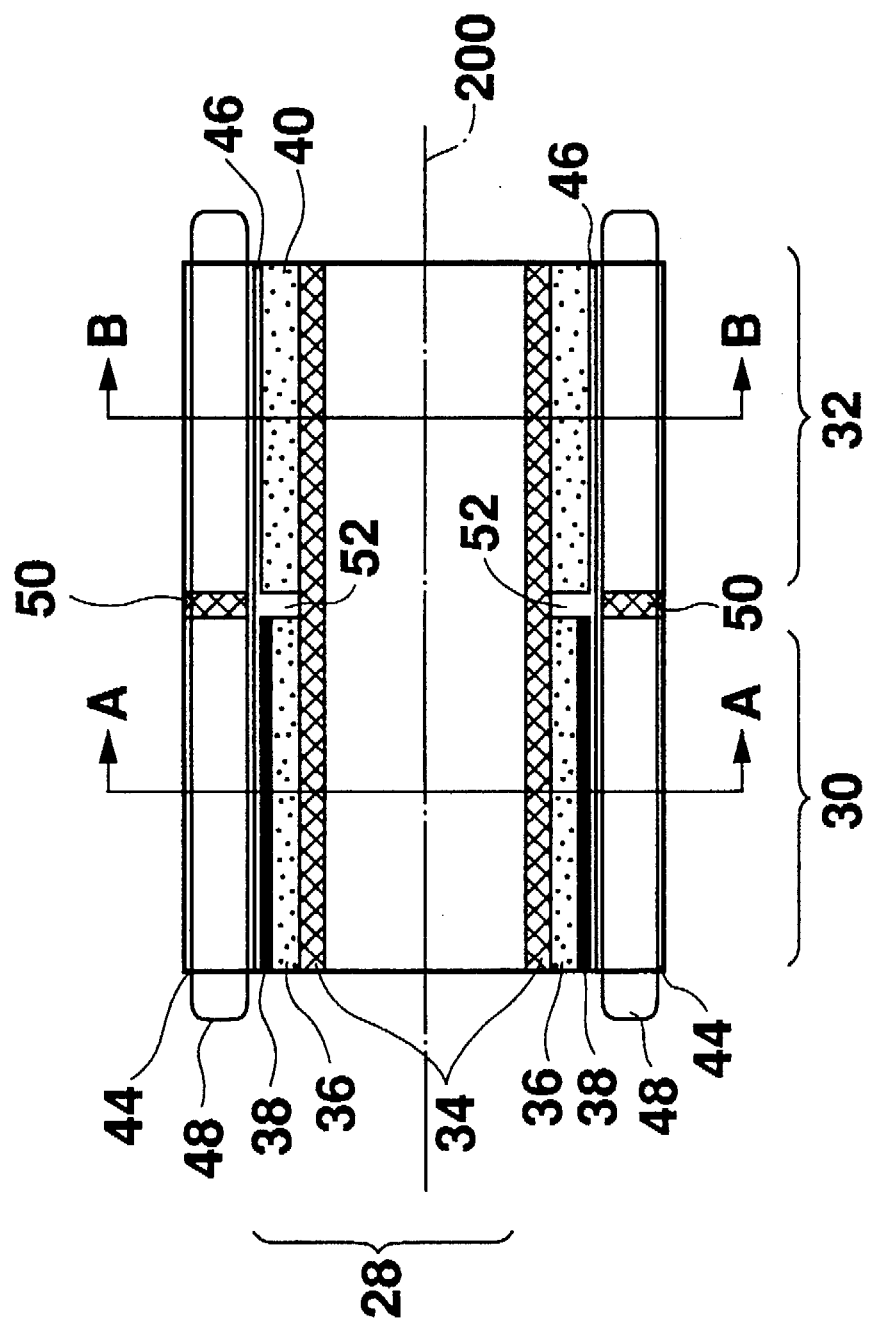
FIG. 4 is a side sectional view showing a structure of another motor which to the invention is applicable.

The invention can be applied to a hybrid type motor as shown in FIG. 4. The present applicant of the present application has already filed a Patent Application in the Japanese Patent Office with a title of "such motor" having the structure as described (Japanese Patent Laid-Open Publication No. Hei 7-59310). The motor in the drawing has a construction which is partitioned Into a permanent magnet motor member 30 and a reluctance motor member 32, with its rotor 28 being along a direction of an axis 200. More specifically, the rotor 28 has a constitution, on a cylinder of a non-magnetic member 34, which is formed of the permanent magnet motor member 30, composed of a magnetic member 36 and magnets 38, and the reluctance motor member 32 composed of a magnetic member 40 both of which are separated magnetically by an interval 52. The magnetic member 40 has a salient pole. Correspondingly, a stator 44 wound with a coil 48 is also magnetically separated into the permanent magnet motor member 30 side and the reluctance motor member 32 side by a non-magnetic member 50. The rotor 28 and the stator 44 are opposed to each other across an interval 46. It is possible to increase a reluctance torque by providing a reluctance member on the salient pole of the magnetic member 40.

In such a motor, the magnetic torque and the reluctance torque are commonly used under the same control condition, and hence, a larger output torque can be obtained in comparison with an ordinary PM motor. In addition, the magnet 38 and the salient pole do not interfere each other, either in terms of a magnetic path or shape, and so the freedom of design is improved. This makes it possible to provide a higher output capable of suitably constituting both shapes and reducing torque fluctuation.

Figure 7:
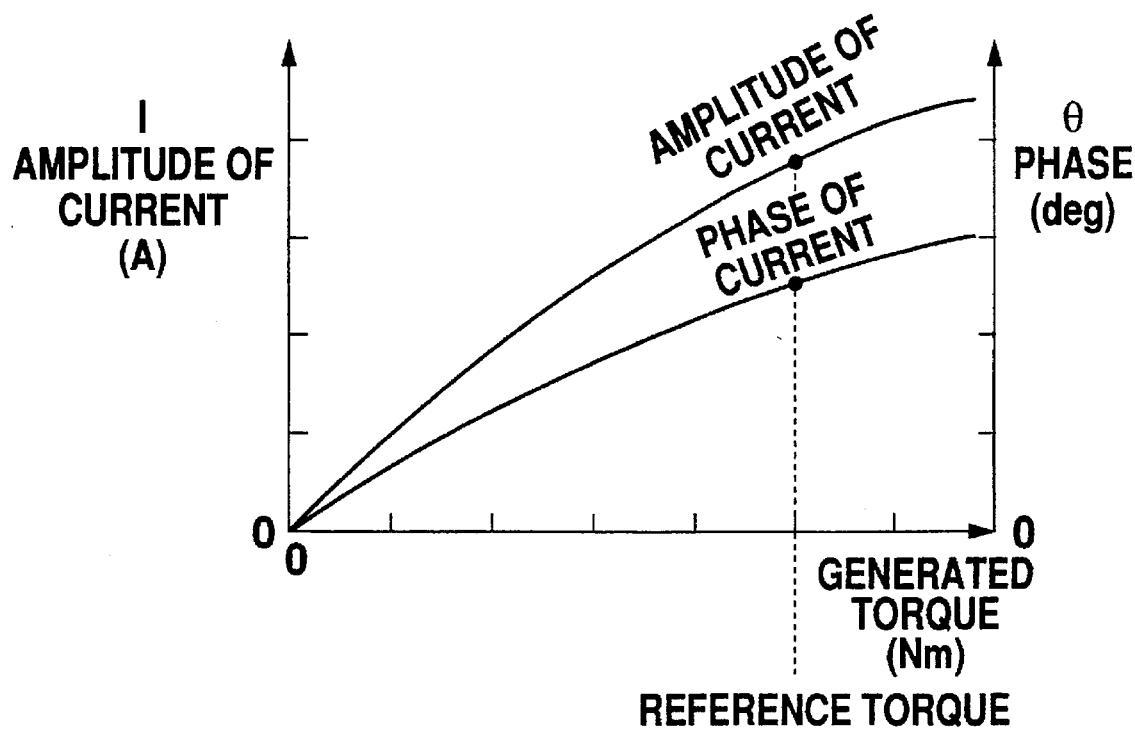
FIG. 7 is a graphical representation showing a method of decision for a reference current.
Figure 8:
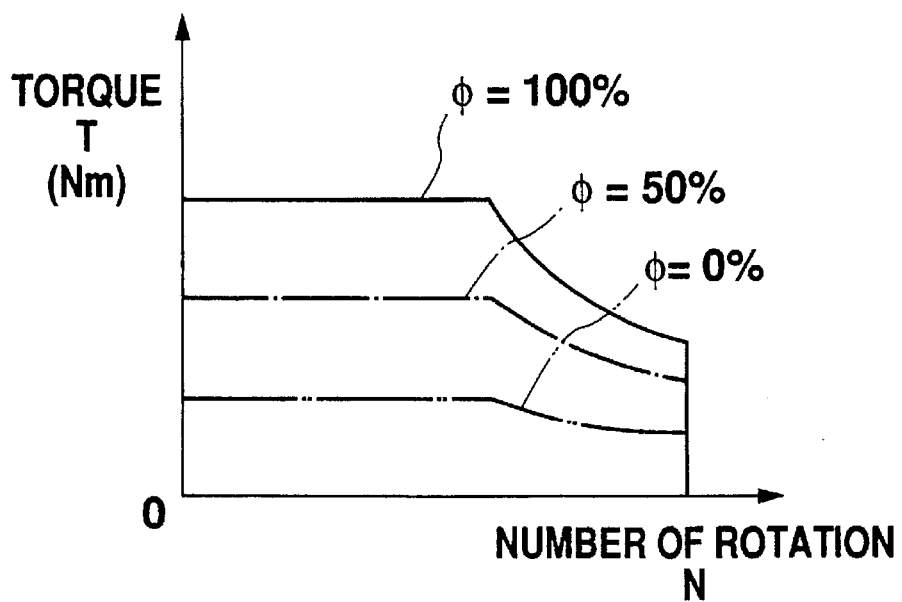
FIG. 8 is an illustrative view showing the problem of the conventional example.

In the embodiment as described, the magnetic flux $\phi$ is detected by an arithmetic operation. However, according to the Invention, the magnetic flux $\phi$ may preferably be detected directly by a Hall device, a magnetoresistance element, etc. Each arithmetic operation in the embodiment may, according to the invention, preferably be executed as a reference of a map. For example, a map of an amplitude vs phase of the reference torque shown in FIG. 7 may preferably be rewritten depending on the detected magnetic flux $\phi$ and the contents corrected so as to obtain a maximum torque. Preferably, when it is sufficient to increase an amplitude I, the amplitude I may be corrected at the same time of correction of the phase θ.

What is claimed is:

1. A device for controlling a salient pole type permanent magnet motor having a rotor side and a stator side, a permanent magnet generating an excitation magnetic flux, the permanent magnet disposed on one of the rotor side and stator side, and a salient pole disposed on the same side as the permanent magnet, said device comprising;

demagnetization detecting means for detecting demagnetization of the permanent magnet; and phase control means for changing a phase of current supplied to the salient pole type permanent magnet motor depending on a detected value of the demagnetization.

2. A device as claimed in claim 1, wherein said demagnetization detecting means comprises:

a magnetic force calculation means for calculating an electromotive force of a permanent magnet at a present instant, in accordance with a voltage and current supplied to the salient pole type permanent magnet motor, a number of rotations of the salient pole type permanent magnet motor, and a primary inductance of the salient pole type permanent magnet motor; and demagnetization rate calculation means for detecting a demagnetization rate of the permanent magnet at the present instant in accordance with a normal electromotive force of the permanent magnet and an electromotive force of the permanent magnet at the present instant, wherein the normal electromotive force represents an electromotive force of the permanent magnet in a demagnetization not-yet-generated state.

3. A device as claimed in claim 2, wherein said phase control means comprises;

phase correction means for calculating a maximum-torque-phase at the present instant in accordance with the maximum-torque-phase in a state where demagnetization has not arisen in the permanent magnet and a demagnetization rate of the permanent magnet at the present instant; and target control means for controlling a phase of a current supplied to the salient pole type permanent magnet motor for the maximum-torque-phase at the present instant, wherein the term the maximum-torque-phase means a phase value capable of maximizing an output torque of said salient pole type permanent magnet motor in a case of using, as a target, a phase of the current supplied to the salient pole type permanent magnet motor.

4. A method of controlling a salient pole type permanent magnet motor having a rotor side and a stator side, a permanent magnet capable of generating an excitation magnetic flux wherein the permanent magnet is disposed on one of the rotor side and the stator side, and a salient pole disposed on the same side as the permanent magnet, comprising the steps of:

detecting demagnetization of the permanent magnet; and varying a phase of current supplied to the salient pole type permanent magnet motor depending on a detected value of the demagnetization.

5. A motor system comprising:

a salient pole type permanent magnet motor having a rotor side and a stator side and including a permanent magnet for generating an excitation magnetic flux wherein the permanent magnet is disposed on one of the rotor side and the stator side, and a salient pole disposed on the same side as the permanent magnet;

demagnetization detecting means for detecting demagnetization of the permanent magnet; and phase control means for varying a phase of current supplied to the salient pole type permanent magnet motor depending on a detected value of the demagnetization.

6. A motor system as claimed in claim 5, wherein the salient pole type permanent magnet motor comprises:

a permanent magnet motor member having the predetermined permanent magnets disposed at a predetermined electric angular interval on a rotating shaft of the salient pole type permanent magnet motor;

a reluctance motor member which is partitioned along a shaft direction of the rotating shaft from the permanent magnet motor member and which has predetermined salient poles disposed at a specified electric angular interval on the rotating shaft; and separating means for magnetically separating the permanent magnet motor member from the reluctance motor member.

7. A system as claimed in claim 5, further comprising;

a direct-current power supply outputting a direct-current power; and electric power conversion means for converting the direct-current power Into alternating-current power, wherein phase control means controls a conversion process of the electric power conversion means, thereby varying a phase of current supplied to the salient pole type permanent magnet motor depending on the detected value of the demagnetization.

* * * * *